United States Patent Office 2,787,522
Patented Apr. 2, 1957

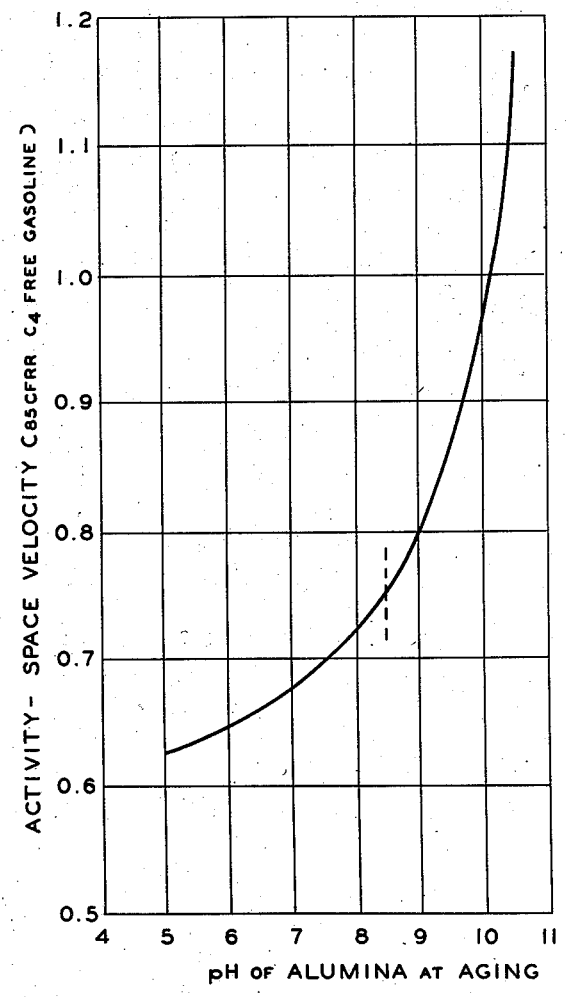

2,787,522

IMPROVED METHOD OF PREPARING ALUMINA

Philip A. Lefrancois, Cranford, N. J., assignor to The M. W. Kellogg Company, Jersey City, N. J., a corporation of Delaware Application April 15, 1952, Serial No. 282,451

12 Claims. (Cl. 23—143)

This invention relates to a novel method of preparing alumina, and more particularly relates to a novel method of preparing an alumina which is especially adapted for use in the catalysis of hydrocarbon conversion reactions.

An object of this invention is to provide a novel method of preparing alumina.

Another object of this invention is to provide a novel method for preparing alumina which is especially adapted as a carrier or supporting material for catalysts.

Still another object of this invention is to provide a novel method for preparing alumina which is especially useful in catalytic reactions, particularly hydrocarbon conversion.

A further object of this invention is to provide a novel method for preparing alumina, which is useful for the catalysis of hydrocarbon conversions, and more particularly for catalyzing the reforming of hydrocarbon oils.

Other objects and advantages of this invention will become apparent from the following description and explanation thereof.

In accordance with the present invention, the alumina is prepared by the method which comprises reacting a mixture including water, an activating agent which can be a metal situated lower than aluminum in the electromotive series and/or a compound thereof, a strong acid and aluminum to form alumina; treating the alumina with an alkaline reagent and then aging the same for a suitable period of time. The alumina gel thus formed is then dried and calcined to produce the finished product.

In another aspect of this invention, the alumina which is derived from the reaction of the mixture including aluminum, water, a strong acid and an activating agent is treated with an alkaline reagent to adjust the pH to at least about 5 and then followed by an aging period of at least about 10 hours.

The first step in preparing the alumina is to produce the alumina sol from the reaction of the mixture including water, the activating agent, aluminum and a strong acid. The aluminum is employed in the metallic state and it can be used in any physical form for the reaction. In this respect, the aluminum can be furnished as small strips, sheets, pellets, in powdered or finely divided form, lumps, turnings, etc. One precaution which should be taken is to safeguard against the use of aluminum which has been oxidized as a result of standing or being exposed to the atmosphere for a long period of time. It is known that aluminum will oxidize upon standing and as a result, an oxide of aluminum film will coat the surface thereof. The oxide coating is resistant to the reaction with water and acid in the presence of the activating agent, consequently, the rate of reaction will be slowed down by the presence of this oxide material.

For the intended reaction, generally about 0.1 to about 1.5 pounds of aluminum per pound of water, preferably about 0.3 to about 1.0 pounds of aluminum per pound of water, are employed. The presence of an activating agent activates the reaction between the aluminum and water. This activating agent can be a metal which is below aluminum in the electromotive series and/or a compound of such metal. By having an activating agent present during the reaction as either a metal or a compound thereof, an electromotive potential is created between the aluminum and the activating agent which facilitates the main reaction between the aluminum with water. Ordinarily, the slightest electromotive potential which can be created between the aluminum and the activating agent is useful for the purpose of activating the reaction between aluminum and water; however, those metals and the compounds of such metals which have a lower electromotive potential than aluminum by at least about 0.2 volts are preferred, because there is less tendency for the polarizing effects of hydrogen to occur. Usually, about 0.0005 to about 0.01 pounds of activating agent per pound of aluminum, preferably about 0.002 to about 0.008 pounds of activating agent per pound of aluminum, are employed in the reaction involving the preparation of the alumina sol. In addition to the above reactants, a strong acid is used in the reaction. A strong acid is one which has a high ionization constant, for example, at least about $10^{-2}$. The amount of acid which is used for the reaction is generally small, and it constitutes about 1 to about 15% by weight, based on the water, preferably about 3 to about 10% by weight, based on the amount of water which is used in the reaction.

The alumina sol can be obtained by allowing the mixture of water, strong acid, aluminum and activating agent to react spontaneously at any suitable pressure, e. g., atmospheric without the application of heat. The reaction is exothermic, consequently the temperature rises to about 212° F. at atmospheric pressure, or the boiling point of water. The temperature remains at this level due to the evaporation of water until the reaction subsides, and then the alumina sol is separated from the unreacted aluminum at a convenient handling temperature, e. g. about 175° F. It is also contemplated to initiate the reaction by the application of heat at the outset, and then permitting the reaction to proceed in the manner described above. In order that the rate of reaction can be either increased or decreased, the reaction can be conducted under a vacuum or a superatmospheric pressure. Accordingly, the reaction temperature can be about 120° to about 300° F., preferably about 175° to about 215° F.

As previously indicated the alumina sol is obtained by reacting the mixture of water, acid, aluminum and activating agent at a temperature of about 120° to about 300° F., preferably about 175° to about 215° F. This reaction is conducted satisfactorily at atmospheric pressure, however, it also can be effected by employing a pressure in the range of about 5 to about 500 p. s. i. a. Higher pressures make possible the use of higher temperatures, because of the limitation on operating conditions at atmospheric conditions due to the boiling point of water. At higher temperatures, the rate of reaction is faster and, hence, less time will be required for the production of alumina sol. This reaction can be conducted in any convenient vessel as either a batch or continuous process, provision being made for the reuse of the activating agent whenever possible.

The activating agent includes any metal or a compound of any metal which is lower than aluminum in the electromotive series. This includes, for example, such metals as silver, zinc, platinum, iridium, mercury, cadmium, ruthenium, rhodium, etc., more particularly, those metals of groups I, II and VIII which are lower than aluminum in the electromotive series. The activating agent in the form of a compound can be used as either an organic or inorganic compound. The activating agent in the form of a compound includes, for example, the oxides, halides (fluorides, chlorides, bromides and iodides), nitrates, sulfates, carbonates, nitrites, sulfites, phosphates, oxyhalides, hydroxides, formates, acetates, propionates, alkyl or aryl or mixed metallo compounds, basic carbonates, chromates, cyanides, oxalates, silicofluorides, etc.

Specific examples of compounds which can be used as activating agents are mercuric oxide, mercuric acetate, chloroplatinic acid, mercuric nitrate, mercurous chloride, silver nitrate, rhodium chloride, etc.

The strong acid which is employed in the reaction includes any organic or inorganic acid which is commonly known as a strong acid for the reason that it possesses, for example, an ionization constant of at least about $10^{-2}$. The acids which can be used for the purpose of this invention include, for example, hydrochloric acid, sulfuric acid, nitric acid, aqua regia, di- and tri-chloroacetic acid, glycerophosphoric acid, iodic acid, periodic acid, phosphorous acid, picric acid, pyrophosphoric acid, sulfurous acid, thiosulfuric acid, perchloric acid, hydrobromic acid, etc.

In the prior art, it is taught reacting aluminum, water and the activating agent in the presence of a weak acid or one which has a low ionization constant. The acids normally used are acetic acid, formic acid, tartaric acid, citric acid, etc. As a result of the reaction, an alumina sol is formed which is then coagulated into a gel by various techniques. The use of a weak acid for this purpose results in the formation of an alumina sol which is extremely difficult to convert or transform into an alumina gel, which upon drying and calcination, will form a poorer quality of alumina. Under the conditions known heretofore, it was not possible to obtain the quality of my alumina by using a weak acid in the preparation of the alumina sol. Quite unexpectedly, by means of this invention it was found that the use of a strong acid in the preparation of the alumina sol would yield a product which lends itself to suitable treatment to obtain my alumina.

The transformation of the alumina sol into my alumina takes place, to some extent, in a gradual manner. From laboratory experiments, it was found that, in certain instances, the alumina produced from the sol which has been aged at a low pH value is not as good as the alumina which is aged at higher pH values. Accordingly, in the present invention, it is preferred to adjust the alkalinity of the alumina sol with an alkaline reagent to a preferred pH of about 8.5 to about 13. In this range of pH values, it is found that an unexpectedly better quality of alumina is obtained when the treated alumina sol is aged for a suitable period of time. It should be understood, however, that for the purposes of this invention, it is intended to include those operations in which the alumina sol is treated with an alkaline reagent to adjust the pH to at least about 5, preferably at least about 8.5, and as high as the lowest value which has been indicated for the preferred range.

As previously indicated, the alumina sol is treated with an alkaline reagent for the purpose of adjusting the pH thereof to a desired level. For this purpose, the alkaline reagent to be employed includes, for example, bases, the salts of strong bases and weak acids, basic quaternary ammonium compounds, etc. Generally, the alkaline reagent can include the alkali and alkaline earth metal oxides and hydroxides, and also those alkali and alkaline earth metal salts which have been derived from weak acids. Those alkaline reagents which can be used are ammonia, substituted ammonium compounds, etc. Specific examples of alkaline reagents are ammonium hydroxide, tetramethyl ammonium hydroxide, sodium hydroxide, potassium hydroxide, iso-amylamine, butyl amines, diethylamine, piperidine, etc. Usually, it is preferred to employ ammonium hydroxide as the alkaline reagent, unless it is desired or no undesirable effects arise from incorporating a metal into the alumina by the use of an alkaline reagent containing such a metal. Ammonium hydroxide or ammonia is unique as the alkaline reagent because either one can be readily removed from the alumina mass upon drying and/or calcination. The quantity of alkaline reagent which is employed for treating the alumina sol will depend upon the pH to which the alumina sol must be adjusted. This quantity may vary considerably depending upon the quantity of strong acid employed for the primary reaction as well as the pH to which the sol must be adjusted. As indicated above, it is intended to include within the scope of this invention, the treatment of the alumina sol with an alkaline reagent to adjust the pH thereof to at least about 5, preferably at least about 8.5. The preferred range of pH is about 8.5 to about 13, and by such alkaline condition, it was noted that a substantially more active alumina is obtained.

After the pH of the alumina sol has been adjusted to the desired value, then the treated sol or gel is permitted to age for a suitable period of time. The aging period which is required to obtain my alumina may vary depending upon the pH at which the alumina has been aged. In this respect, those aluminas which have been aged at a low pH value will require longer periods in order to become an alumina product of good quality. On the other hand, the higher the pH at which the alumina is aged, the shorter period of aging is necessary to obtain an alumina product of good quality. Generally, the treated alumina gel is aged for a period of at least about 10 hours, more usually at least about 17 hours. This aging period may or may not include the time during which the alumina gel is dried prior to the calcination treatment. Accordingly, an alumina sol may be treated with an alkaline reagent for adjustment of the pH to the desired level, and then immediately following the treatment, the alumina sol is dried under suitable conditions. In this type of a procedure, the drying operation is generally at least about 10 hours in duration. As previously mentioned, the shorter aging periods can be used for treating sols of high alkalinity; whereas, on the other hand, the treated sols of low alkalinity may require longer periods of aging. In this regard, the aging period may be as high as one month in length, although more usually, the sols of low alkalinity are aged for a period as high as about 100 hours.

It is also intended, within the scope of this invention, to prepare a catalytic support of alumina which possesses exceptionally high stability towards heat insofar as my alumina is concerned. The heat stability of my alumina is improved substantially by the incorporation of silica. During the preparation of the alumina, the silica can be added by a variety of methods, for example, (1) silicon tetrachloride, an organic silicate, cracking catalyst hydrogel (silica-alumina, silica-magnesia, etc.) fluosilicic acid, magnesium fluosilicate, etc. can be included in the mixture of reactants, viz., aluminum, water, activating agent and strong acid; (2) the silicon tetrachloride, organic silicate, silica gel, silica sol, dried and/or calcined silica gel, etc., can be added to the alumina sol before the pH adjustment with alkaline reagent; (3) silica gel, organic silicate, etc., can be added to the alumina gel after the pH adjustment with an alkaline reagent; (4) silicon tetrachloride, organic silicate, silica gel, dried and/or calcined silica gel can be added to the aged alumina gel; and (5) silicon tetrachloride, organic silicate, the gel or sol of silica, with or without drying, can be added to the dried and/or calcined alumina gel.

By procedures described above, silica becomes a component part of the alumina product. As a result, the stability of my alumina towards elevated temperatures is substantially improved. Generally, the content of silica in the catalytic support constitutes at least about 0.5% by weight, preferably about 2 to about 10% by weight, based upon the weight of alumina.

The aged alumina gel, with or without the silica forming substance, can be subjected to a drying operation in order to remove substantial quantities of water. This drying operation is effected, generally, by subjecting the catalytic support mass to a temperature not greater than about 400° F. Drying is accomplished more usually by subjecting the catalytic support mass to a temperature in the order of about 150° to about 250° F. At the elevated temperatures, the gel material is allowed to dry for a period of at least about 10 hours and this drying period can be as high as about 60 hours. More usually, the period of drying is about 15 to about 25 hours. Drying is also effected by the spray technique which involves spraying the alumina gel, with or without silica, into a hot chamber. The alumina thus dried is in a powdered form, usually of microspherical shape, which is especially useful for a fluid operation. After drying the catalytic support mass, it is then subjected to a calcination treatment at an elevated temperature. At the elevated temperature, the gel is transformed into the finished alumina. The calcination may be effected, generally, at a temperature of at least about 600° F. and this temperature can be as high as about 1500° F. More usually for calcination of the gel, a temperature of about 900° to about 1250° F. is employed. At the elevated temperature, the gel is maintained for a period of up to about 12 hours, or more usually, the calcination period is from about 2 to about 6 hours. Higher temperatures are to be avoided in the calcination treatment because there is a tendency for the alumina to convert or transform into another type of alumina of relatively less activity. In some instances, it is desirable to conduct the drying and calcination treatments as a single operation. In this operation, the gel with or without the silica is subjected to the elevated temperature at which calcination is effected. The drying is accomplished in a rapid manner, more or less by flashing off any volatile materials which are present in the catalytic support mass. Ordinarily, for this technique, a temperature in the range of about 600° to 1000° F. is employed and the treatment lasts for about 3 to about 15 hours.

My alumina as a catalytic support can be used in combination with any of the catalytic agents which are known today. In this respect, it can be used in amounts which vary considerably depending upon the type of catalytic material. For example, in cracking catalysts, the alumina constitutes a minor amount of the total catalyst. In the case of a reforming catalyst, the alumina is the predominating component thereof.

The alumina of the present invention can be used in any type of reaction wherein the heretofore known types of alumina have been employed. Such applications include, for example, hydrocarbon conversion, e. g., hydroforming, hydrocracking, catalytic cracking, etc.; hydrogenation; dehydrogenation; cyclization; desulfurization; hydrodesulfurization; isomerization; hydrocarbon synthesis; etc.

In order to more fully understand the present invention, specific examples of the method by which my alumina can be prepared will be given. It should be understood however, that no undue limitations or restrictions are to be imposed by reason thereof.

The following two examples of catalyst preparations are intended to illustrate the superior activity of my alumina over a previously known alumina as a catalytic material for a molybdena catalyst which is used for hydroforming.

CATALYST I

The alumina-silica sol was made by reacting the following materials: 1500 pounds of aluminum shot, approximately 7500 pounds of used aluminum shot remaining in the tank from previous reactions, 3500 gallons of water, 280 pounds of silicon tetrachloride, and 1460 pounds of 88% formic acid. The alumina-silica sol after centrifuging contained 13% solids and had a specific gravity of 1.150 at 100° F. Approximately 175 pounds of concentrated ammonium hydroxide was added to produce a thickening (gelation) of the sol (5 pH). This material was dried on a steam heated double drum dryer. The dried powder had an ignition loss of 57% and was calcined in a gas fired rotary drier at 1150° F., discharge temperature. The calcined powder was impregnated with ammonium molybdate solution by spraying the alumina in a Simpson mixer (edge runner) using 150 pounds per batch. The wet paste was placed on stainless clad-carbon steel trays and calcined for 6 hours at 1470° F. in a box type oil fired 8' x 10' hearth furnace. The product analyzed 9.27% $MoO_3$ and 2.90% $SiO_2$.

The powder was stored in fiber drums. A sample was removed and calcined 6 hours at 1470° F. in a laboratory furnace. After pelleting into 3/16" pills using 2% aluminum stearate as a lubricant the catalyst was recalcined 3.5 hours at 1200° F. to burn off the stearate. A test unit charge of 460 cc. weighed 475 grams. X-ray showed gamma-alumina. The finished catalyst contained 9% by weight of $MoO_3$.

CATALYST II

An alumina-silica sol was prepared in a 20 gallon barrel using a 1/4 H. P. agitator with a 3 inch ring propeller having a speed of 400 R. P. M. 8100 grams of aluminum pellets (99.5% purity), 16 liters of water, 1200 cc. of concentrated HCl acid (37% HCl), 50 grams of mercuric oxide and 70 cc. of silicon tetrachloride were charged to the barrel. The mixture was agitated and the reaction was allowed to proceed for 1.5 hours. A dark grey sol was produced and this material was passed through a cheesecloth into a stainless steel bucket. The filtered sol weighed 13.523 kg. and had a volume of 11.8 liters. By direct ignition, it was found that the sol contained 15.0% by weight of solids. Chemical analysis of the sol showed 14.82% of $Al_2O_3$, 0.23% $SiO_2$ and 4.09% chloride ions. X-ray analysis of the sol resulted in an unidentified cubic pattern.

A second batch of alumina sol was prepared by employing the same quantities of chemicals which are described above, however, the agitation with the 1/4 H. P. agitator was done at 1700 R. P. M. and the reaction was allowed to proceed for 1.25 hours. The volume of sol measured 10.25 liters and weighed 12.251 kg. at 52° C. The pH of the sol was 4.72 at 22° C. By direct ignition, the solids content of the sol was 16.2 by weight. Chemical analysis of the sol showed 16.32% $Al_2O_3$, 0.29% $SiO_2$ and 4.62% chloride ions.

Both of the above prepared sols were combined, mixed and found to weigh 25,483 grams. A one-half portion of the sol measuring 11 liters was treated with 11 liters of concentrated ammonium hydroxide. The sol gelled to almost a solid state and then gradually thinned. The pH of the gel was 10.5 at 25° C. The gel was then stirred slowly overnight for a total of 16 hours. The aged alumina gel which weighed 10.76 kg. was placed on an aluminum tray and dried at 240° F. for 21.5 hours in a Despatch oven. The grayish white granules were ground to a powdered form which weighed 1679 grams. The powder was then calcinated in a furnace for 3 hours at 1200° F. and the calcined product weighed 852 grams. Analysis of the calcined product showed 96.98% $Al_2O_3$, and 0.40% chloride ions.

The calcined powder of alumina was impregnated with ammonium molybdate solution. The ammonium molybdate solution was prepared by dissolving 114.7 grams of ammonium molybdate in 750 cc. of water. The ammonium molybdate solution was then combined with 850 grams of powdered alumina. An additional 150 cc. of water was added in order to insure the formation of a uniform paste. The impregnated alumina was then dried at 240° F. for a period of 18 hours in the Despatch oven. After drying, the material was ground to a powdered form which weighed 993 grams. Thereafter, the powdered catalyst mass was pelleted into 3/16" pills which were then calcined for 3 hours at 1200° F. The finished catalyst analysis showed 1.93% SiO2, 9.91% MoO3 and 0.05% of chloride ions.

As previously mentioned, Catalyst I contained a previously known alumina as the support material; whereas Catalyst II contained my alumina. The relative effectiveness of these two types of aluminas as supporting material was determined by using the same in a laboratory hydroforming test unit. In these tests, a Mid-Continent naphtha having an initial boiling point of 230° F. and an end point of 430° F. was used. This naphtha had an octane number (CFRM) of 30 and contained approximately 9% aromatics by volume. The reactor of the test unit had a 550 cc. capacity. The respective catalyst in a suitable quantity was charged to the reactor. Hydrogen was fed in a pure state at the rate indicated (S. C. F. B.) measured as standard cubic feet per barrel of oil feed, the volume of gas being measured at 60° F. and 760 mm. mercury. The regeneration of the catalyst was conducted by purging the same with hydrogen after it had become partially deactivated by the accumulation of carbonaceous deposits. The pressure of the system was released and then purged with nitrogen. The catalyst was then heated to about 950° F. and air was introduced along with the nitrogen. The concentration of air was regulated to produce a maximum temperature of 1050° F. in the catalyst bed. During this operation, the temperatue at various points in the bed was ascertained with two thermocouples, one located in the upper part and the other in the lower part of the bed. The flow of nitrogen and air through the reactor was continued for about ½ hour, namely, after the temperature dropped to about 950° F. Following another nitrogen purge, the system was again placed under hydrogen pressure for about 1 hour, while the hydrogen rate and temperature were being adjusted before feeding the naphtha again.

Employing the procedure in the laboratory test unit described above, Catalysts I and II were evaluated. The results of these tests are given in Table I below.

Table I

| Run No. | 1 | 2 | 3 | 4 |
|---|---|---|---|---|
| Catalyst | II | II | I | I |
| Operating Conditions: | | | | |
| Temperature, °F | 900 | 900 | 898 | 899 |
| Pressure, p. s. i. g | 250 | 250 | 250 | 250 |
| Space Vel. Wo/hr./Wc | 1.01 | 0.53 | 0.97 | 0.54 |
| Hydrogen, S. C. F. B | 5,024 | 4,799 | 4,941 | 4,238 |
| Catalyst charge, gm | 473 | 473 | 475 | 475 |
| Naphtha, gm./hr | 477 | 250 | 462 | 256 |
| Period of run, hrs | 8 | 8 | 8 | 8 |
| Yields (Output Basis): | | | | |
| Carbon, Wt. Percent | 0.117 | | | 0.171 |
| Hydrogen, S. C. F. B | 490 | 461 | 520 | 633 |
| Dry Gas, S. C. F. B | 915 | 1,027 | 750 | 943 |
| Total Butanes, Vol. Percent | 8.0 | 10.8 | 4.4 | 4.9 |
| 100% C4 Gasoline,[1] Vol. Percent | 83.1 | 79.9 | 88.4 | 85.0 |
| 10# RVP Gasoline, Vol. Percent | 83.5 | 76.6 | 94.4 | 89.8 |
| Polymers, Vol. Percent | 3.8 | 3.6 | 3.3 | 3.5 |
| Octane No. CFRR Clear: | | | | |
| 100% C4 gasoline | 89.0 | 95.6 | 74.5 | 83.7 |
| 10# RVP gasoline | 89.0 | 95.4 | 76.1 | 84.6 |
| Space Velocity, Wo/hr./Wc, to give C4 free gasoline of 85 CFRR oct. no. | 1.17 | | 0.47 | |
| 100% C4 Gasoline, Vol. Percent, of 85 CFRR (O. N.) | 85.7 | | 84.7 | |

[1] Gasoline of 400° F. (E. P.)

From Table I above, it can be seen that under comparable operating conditions, the alumina of this invention resulted in a substantially higher octane number of reformed gasoline than is obtained in the case of using the previously known alumina as the support material. By comparing the space velocity required to give 85 CFFR octane number C4 free gasoline, this effect is more noticeable. In addition, the selectivity as shown by the volume percent of 100% C4 gasoline of 85 CFRR octane number is substantially greater for my alumina. These results clearly demonstrated the substantially greater activity of my alumina over the other alumina.

Various other catalysts were prepared in which the pH adjustment by treatment with an alkaline reagent was varied prior to the aging period. The preparations of these catalysts are given below.

CATALYST III

The following ingredients in the order of addition were charged to a 20 gallon barrel:

12,818 grams of aluminum pellets,
20 liters of distilled water,
1250 cc. of concentrated hydrochloric acid (37% HCl),
65 grams of mercuric oxide, and
285 cc. silicon tetrachloride (150 grams SiO2).

The mixture was agitated by means of a 1700 R. P. M. ⅛ H. P. stirrer and a short time after the last compound was added a violent reaction occurred. After a 1 hour period, the reaction had subsided, but there was still present some foaming due to the evolution of hydrogen. The total reaction time was 1.5 hours. A gray alumina sol was produced which weighed 14,439 grams at 175° F. and had a pH of 4.84 at 29° C. Approximately 2 liters of distilled water were added to a portion of the alumina sol weighing 4813 grams. The diluted sol had a pH of 4.43 at 29° C. In order to raise the pH to 5, 25 cc. of concentrated ammonium hydroxide (28–30% ammonia) diluted with an equal volume of water were added to the slurry. The resultant pH after the addition of concentrated ammonium hydroxide was not the required value, thus an additional 25 cc. of concentrated ammonium hydroxide diluted with an equal volume of water were added. After agitating the alumina for a ¾ of an hour period, the slurry was transferred to a drying tray and then placed in a Despatch oven to dry at 240° F. The alumina was allowed to dry for 17½ hours. Thereafter, it was calcined for a 3 hour period at 1200° F. The calcined alumina was ground and then passed through a 20 mesh screen. The ground alumina weighed 883 grams.

The ground alumina was impregnated with a solution containing 105 grams of ammonium molybdate $$((NH_4)_6Mo_7O_{24} \cdot 4H_2O)$$

dissolved in 700 cc. of distilled water. The impregnated alumina was placed in an oven to dry at 240° F. Thereafter, the dried material was calcined for 3 hours at 1200° F. The calcined catalysts were pelleted into 3/16" pills which contained 8.91% molybdena, 4.70% silica and 0.04% chloride ions on alumina, on a weight basis.

CATALYST IV 4813 grams of alumina sol which was prepared by the procedure described in Catalyst III were mixed with 2 liters of distilled water and stirred thoroughly. 350 cc. of concentrated ammonium hydroxide were added and this caused the sol to transform into a gel. In order to facilitate stirring 3½ liters of distilled water were added to the gel. Thereafter, a solution of 1 liter of distilled water containing 50 cc. of concentrated ammonium hydroxide was added to the slurry in order to raise the pH to approximately 8.5 at 34° C. The mixture was agitated for an additional 17 hours and then transferred to a Despatch oven for drying at 240° F. The alumina was dried for a period of 23½ hours. It was then calcined for 3 hours at 1200° F. before grinding the same for passage through a 20 mesh screen.

The alumina was activated by impregnating 952 grams is concerned when employing about 5% by weight of silica and up to about 10% by weight or higher.

In the following catalyst preparation the alumina was activated in a wet condition with ammonium molybdate. This catalyst was prepared in order to determine the difference, if any, that the conditions of activation would have on catalyst activity.

CATALYST IX

The alumina-silica slurry prepared in accordance with the procedure described in Catalyst VI had been aged for a total period of 16 hours. The aged gel containing 1000 grams of the alumina-silica was activated directly with a solution containing 135.3 grams of ammonium molybdate $((NH_4)_6Mo_7O_{24} \cdot 4H_2O)$ dissolved in 500 cc. of water. The mixture was stirred for ¾ of an hour. The pH of the mixture was 10.13 at 24° C. The catalyst mixture was dried at 240° F. for 22 hours. Thereafter, the dried catalyst was ground before calcination at 1200° F. for 3 hours. The calcined catalyst powder was pelleted into 3/16" pills. The final catalyst contained 9.73% molybdena, 1.88% silica and 0.19% chloride ions on alumina, on a weight basis.

Catalyst IX was evaluated in the laboratory test unit described above. The results obtained by the use of Catalyst IX were compared with the results obtained under comparable operating conditions when employing Catalyst VI. These results are reported in Table IV below.

Table IV

| Run No. | 1 | 2 |
|---|---|---|
| Catalyst | IX | VI |
| Operating Conditions: | | |
| Temperature, °F. | 900 | 900 |
| Pressure, p. s. i. g. | 250 | 250 |
| Space Vel., W₀/hr.W_c | 1.02 | 1.01 |
| Hydrogen, S. C. F. B | 5,042 | 5,024 |
| Catalyst charge, gms. | 461 | 473 |
| Naphtha, gms./hr | 471 | 477 |
| Period of run, hrs. | 8 | 8 |
| Yields (Output Basis): | | |
| Carbon, Wt. Percent | 0.137 | 0.117 |
| Hydrogen, S. C. F. B | 67 | 490 |
| Dry Gas, S. C. F. B | 309 | 915 |
| Total Butanes, Vol. Percent | 4.8 | 8.0 |
| C₄ free gasoline, Vol. Percent | 85.1 | 75.1 |
| 100% C₄ gasoline, Vol. percent | 89.9 | 83.1 |
| 10# RVP gasoline, Vol. percent | 95.0 | 83.5 |
| Polymer, Vol. percent | 2.2 | 3.8 |
| Octane No. CFRR Clear: | | |
| C₄ free gasoline | 70.6 | 87.8 |
| 100% C₄ gasoline | 72.2 | 89.0 |
| 10# RVP gasoline | 73.7 | 89.0 |
| Yield of 10# RVP gasoline, Vol. percent 85 CFRR octane no. | 84.5 | 86.8 |
| Space velocity to obtain 85 CFRR O. N. C₄ free gasoline. | 0.47 | 1.17 |

On the basis of the data presented in Table IV above, it is to be noted that Catalyst VI is more active than Catalyst IX. The difference in results is attributed to the procedure of impregnating a calcined alumina with a solution of ammonium molybdate over the technique of adding the solution of ammonium molybdate directly to the alumina gel. The results clearly demonstrate that the preferred procedure involves impregnation of the calcined alumina with the desired catalyst agent.

Having thus described my invention by reference to specific examples thereof, it should be understood that no undue limitations or restrictions are to be imposed by reason thereof, but that the scope of this invention is defined by the appended claims.

I claim:

1. A method for preparing alumina which comprises reacting a mixture including water, aluminum substantially free of oxide coating, a strong acid having an ionization constant of at least about $10^{-2}$ and an activating agent selected from the group consisting of a metal lower than aluminum in the electromotive series and a compound thereof, to form alumina; treating the alumina thus formed with an alkaline reagent to adjust the pH thereof to at least about 8.5; aging the alkaline treated alumina at said pH of at least about 8.5 for at least about 10 hours; and then subjecting the alumina to an elevated temperature of at least about 600° F. to convert the same to the finished product.

2. A method for preparing alumina which comprises reacting a mixture including water, aluminum substantially free of oxide coating, a strong acid having an ionization constant of at least about $10^{-2}$ and an activating agent selected from the group consisting of a metal lower than aluminum in the electromotive series and a compound thereof, to form alumina; treating the alumina thus formed with an alkaline reagent to adjust the pH to at least about 8.5; aging the alkaline treated alumina at said pH of at least about 8.5 for at least about 17 hours; and then subjecting the alumina to an elevated temperature of at least about 600° F. to convert the same to the finished product.

3. A method for preparing alumina which comprises reacting a mixture including water, aluminum substantially free of oxide coating, a strong acid having an ionization constant of at least about $10^{-2}$ and an activating agent selected from the group consisting of a metal which has a lower electromotive potential than aluminum by at least about 0.2 volts and a compound thereof, to form alumina; treating the alumina thus formed with an alkaline reagent to adjust the pH to at least about 8.5; aging the alkaline treated alumina at said pH of at least about 8.5 for at least about 17 hours; and then subjecting the alumina to an elevated temperature of at least about 600° F. sufficient to convert the same to the finished product.

4. A method for preparing alumina which comprises reacting a mixture including water, aluminum substantially free of oxide coating, a strong acid having an ionization constant of at least about $10^{-2}$ and an activating agent selected from the group consisting of a metal lower than aluminum in the electromotive series and a compound thereof; at a temperature of about 120° to about 300° F. and for a period sufficient to form alumina; treating the alumina thus formed with an alkaline agent to adjust the pH to at least about 8.5; aging the alkaline treated alumina at said pH of at least about 8.5 for at least about 10 hours; and then subjecting the aged alumina to a temperature of about 600° to about 1500° F. for a period sufficient to convert the same to the finished product.

5. A method for preparing alumina which comprises reacting a mixture including water, aluminum substantially free of oxide coating, hydrochloric acid and mercuric oxide to form alumina; treating the alumina thus formed with an alkaline reagent to adjust the pH to at least about 8.5; aging the alkaline treated alumina at said pH of at least about 8.5 for at least about 10 hours; and then subjecting the aged alumina to an elevated temperature of at least about 600° F. sufficient to convert the same to the finished product.

6. A method for preparing alumina which comprises reacting a mixture including water, aluminum substantially free of oxide coating, hydrochloric acid and mercuric oxide to form alumina; treating the alumina thus formed with an alkaline reagent to adjust the pH to at least about 8.5; aging the alkaline treated alumina at said pH of at least about 8.5 for at least about 17 hours; and then subjecting the alumina to an elevated temperature of at least about 600° F. sufficient to convert the same to the finished product.

7. A method for preparing alumina which comprises reacting a mixture including water, aluminum substantially free of oxide coating, hydrochloric acid and an oxide of a metal of group II of the periodic table which has a lower electromotive potential than aluminum to form alumina; treating the alumina thus formed with an alkaline reagent to adjust the pH to at least about 8.5; aging the alkaline treated alumina at said pH of at least about 8.5 for at least about 10 hours; and then subjecting thereof with a solution containing 114.7 grams of ammonium molybdate $((NH_4)_6Mo_7O_{24}\cdot 4H_2O)$ dissolved in 720 cc. of distilled water. The impregnated alumina was mixed thoroughly prior to being dried at 240° F. for approximately 18½ hours. The dried catalysts were calcined for 3 hours at 1200° F. It was then pelleted into 3/16" pills which contained 8.85% molybdena, 4.91% silica and 0.54% chloride ions on alumina, on a weight basis.

CATALYST V 4813 grams of alumina sol prepared in the manner described in Catalyst III were mixed with 2 liters of distilled water. In order to raise the pH to a value of 10, 1700 cc. of concentrated ammonium hydroxide (28–30% ammonia) were added to the sol. The addition of ammonium hydroxide caused the sol to gel, and therefore, 4 liters of distilled water were added further in order to facilitate stirring. The pH of the gel was found to be 10.16 at 31° C. The gel was then aged for a period of 17 hours with continuous stirring. Thereafter, it was transferred to a Despatch oven for drying at a temperature of 240° F. The alumina was dried and then ground to pass a 20 mesh screen. The ground alumina was calcined for 3 hours at 1200° F.

884 grams of calcined alumina were activated by impregnation with a solution containing 106.1 grams of ammonium molybdate $((NH_4)_6Mo_7O_{24}\cdot 4H_2O)$ dissolved in 600 cc. of distilled water. Another 200 cc. of water were added in order to completely wet the alumina. The impregnated alumina was placed in an oven for drying at 240° F. After the catalyst was dried, it was calcined for 3 hours at 1200° F. The calcined catalyst was then pelleted into 3/16" pills. The finished catalyst contained 8.80% molybdena, 4.82% silica and 0.53% chloride ions on alumina, on a weight basis.

CATALYST VI 8100 grams of aluminum pellets, 16 liters of water, 1200 cc. of concentrated hydrochloric acid (37% HCl), 50 grams of mercuric oxide and 70 cc. of silicon tetrachloride (37 grams silica) were added to a barrel and agitated by means of a 3 inch ring propeller, 400 R. P. M. ¼ H. P. agitator. The reaction was allowed to proceed for 1½ hours passing the dark gray alumina sol through a cheesecloth in order to remove any of the unreacted solid materials. Another batch of alumina sol was prepared by employing the same amounts of reactants as described above, except that the reaction was allowed to proceed for 1¼ hours. The two batches of alumina sols were combined and mixed thoroughly. The alumina sol weighed 25,483 grams and measured 22 liters in volume.

11 liters of alumina sol were combined with 11 liters of concentrated ammonium hydroxide and the sol gelled to a solid consistency. The pH of the gel was 10.5 at 25° C. The gel was then aged for a period of 16 hours while being stirred slowly.

The aged alumina gel weighed 21,523 grams and contained 2000 grams of alumina-silica. 10,760 grams of gel were placed in an oven and dried at 240° F. for 21½ hours. The dried alumina was then ground before calcining for 3 hours at a temperature of 1200° F. 852 grams of calcined alumina were impregnated with a solution containing 114.7 grams of ammonium molybdate $((NH_4)_6Mo_7O_{24}\cdot 4H_2O)$ dissolved in 750 cc. of water. An additional 150 cc. of water were added in order to substantially wet the alumina. The impregnated alumina was dried at 240° F. for 18 hours. The dried catalyst was ground to a powder and then pelleted into 3/16" pills before calcination for 3 hours at 1200° F. The finished catalyst contained 9.91% molybdena, 1.93% silica and 0.05% chloride ions on alumina, on a weight basis.

Catalysts III–VI, inclusive, were tested in the laboratory unit described hereinabove. The results obtained are reported in Table II below.

Table II

| Run No. | 1 | 2 | 3 | 4 |
|---|---|---|---|---|
| Catalyst | III | IV | V | VI |
| Operating Conditions: | | | | |
| Temperature, °F | 899 | 900 | 899 | 900 |
| Pressure, p. s. i. g | 250 | 250 | 250 | 250 |
| Space Vel., $W_o/hr./W_c$ | 1.02 | 0.99 | 0.99 | 1.01 |
| Hydrogen, S. C. F. B | 5,031 | 4,932 | 5,108 | 5,024 |
| Catalyst charge, grams | 549 | 506 | 481 | 473 |
| Naphtha, grams/hour | 560 | 502 | 476 | 477 |
| Period of run, hours | 8 | 8 | 8 | 8 |
| Yields (Output Basis): | | | | |
| Carbon, Wt. Percent | | | | 0.117 |
| Hydrogen, S. C. F. B | 363 | 489 | 553 | 490 |
| Dry Gas, S. C. F. B | 603 | 738 | 892 | 915 |
| Total Butanes, Vol. Percent | 5.3 | 7.2 | 6.5 | 8.0 |
| 100% $C_4$-gasoline,[1] Vol. Percent | 87.4 | 88.1 | 85.6 | 83.1 |
| 10# RVP gasoline, Vol. Percent | 91.4 | 90.6 | 88.3 | 83.5 |
| Polymer, Vol. % | 3.9 | 3.3 | 3.7 | 3.8 |
| Octane No. CFRR Clear: | | | | |
| 100% $C_4$-gasoline | 78.6 | 82.1 | 85.7 | 89.0 |
| 10# RVP gasoline | 79.6 | 82.6 | 86.2 | 89.0 |
| Space Vel. to give 85 CFRR Oct. No. $C_4$ free gasoline | 0.63 | 0.75 | 0.97 | 1.17 |

[1] Gasoline of 400° F. (E. P.).

It is to be noted from Table II that a more active catalyst is obtained when the catalyst is aged at a higher pH. The effect of pH on activity which is measured as the space velocity required in order to obtain a $C_4$-free gasoline having an octane number of 85 CFRR is illustrated by references to the drawing which contains a correlation showing the effect of pH of the alumina gel on aging upon the activity of the catalyst. On the basis of this correlation, it is observed that for improved results the pH of the alumina gel should be at least 8.5 for the aging period given hereinbefore.

The stability of the catalyst at elevated temperatures and the effect of silica concentration thereon is illustrated by means of Catalysts VII and VIII, which are described below.

CATALYST VII

Catalyst VI was calcined for 6 hours at 1470° F.

CATALYST VIII

Catalyst V was calcined at 1470° F. for 6 hours.

Catalysts VII and VIII were evaluated in the laboratory test unit described above. The results obtained are given in Table III below.

Table III

| Run No. | 1 | 2 |
|---|---|---|
| Catalyst | VII | VIII |
| Operating Conditions: | | |
| Temperature, °F | 902 | 902 |
| Pressure, p. s. i. g | 250 | 250 |
| Space Vel. $W_o/hr./W_c$ | 1.00 | 1.01 |
| Hydrogen, S. C. F. B | 4,952 | 4,903 |
| Catalyst charge, grams | 464 | 466 |
| Naphtha, gm./hr. | 464 | 470 |
| Period of run, hrs | 8 | 8 |
| Yields: | | |
| Carbon, Wt. percent | | |
| Hydrogen, S. C. F. B | 335 | 689 |
| Dry Gas, S. C. F. B | 556 | 1054 |
| Total Butanes, Vol. percent | 4.6 | 7.3 |
| $C_4$ free gasoline, Vol. percent | 84.6 | 76.8 |
| 100% $C_4$ gasoline, Vol. percent | 89.3 | 84.2 |
| 10# RVP gasoline, Vol. percent | 95.3 | 85.6 |
| Polymer, Vol. percent | 3.3 | 4.0 |
| Octane No. CFRR Clear: | | |
| $C_4$ free gasoline | 73.0 | 86.1 |
| 100% $C_4$ gasoline | 74.5 | 87.3 |
| 10# RVP gasoline | 76.1 | 87.5 |
| Space Velocity to obtain 85 CFRR octane no. $C_4$ free gasoline | 0.54 | 1.05 |

It is to be noted from Table III above that the catalyst containing approximately 2% by weight of silica did not withstand the accelerated stability test at 1470° F. for 6 hours to the extent observed in the case of the catalyst containing approximately 5% by weight of silica. Accordingly, substantially improved results are obtained insofar as stability of catalyst at elevated temperatures the alumina to an elevated temperature of at least about 600° F. sufficient to convert the same to the finished product.

8. A method for preparing alumina which comprises reacting a mixture including water, aluminum substantially free of oxide coating, hydrochloric acid and a metal of group II of the periodic chart which has an electromotive potential less than aluminum to form alumina; treating the alumina thus formed with an alkaline reagent to adjust the pH to at least about 8.5; aging the alkaline treated alumina at said pH of at least about 8.5 for at least about 10 hours; and then subjecting the alumina to an elevated temperature of at least about 600° F. sufficient to convert the same to the finished product.

9. A method for preparing alumina which comprises reacting a mixture including water, aluminum substantially free of oxide coating, a strong acid having an ionization constant of at least about $10^{-2}$ and an activating agent selected from the group consisting of a metal lower than aluminum in the electromotive series and a compound thereof; mixing therewith a silica forming substance; treating the mixture containing the alumina thus formed with an alkaline reagent to adjust the pH to at least about 8.5; aging the alkaline treated mixture at said pH of at least about 8.5 for at least about 10 hours; and then subjecting the mixture to an elevated temperature of at least about 600° F. sufficient to convert the same to alumina and silica.

10. A method for preparing alumina which comprises reacting a mixture including water, aluminum substantially free of oxide coating, hydrochloric acid and mercuric oxide to form alumina; treating the alumina thus formed with ammonium hydroxide to adjust the pH to at least about 12; aging the treated alumina at said pH of at least about 12 for at least about 10 hours; and then subjecting the alumina to an elevated temperature of at least about 600° F. sufficient to convert the same to the finished product.

11. A method for preparing alumina which comprises reacting a mixture including water, aluminum substantially free of oxide coating, hydrochloric acid and mercuric oxide at a temperature of about 175° to about 215° F. to form alumina; treating the alumina thus formed with ammonium hydroxide to adjust the pH to at least about 8.5; aging the treated alumina at said pH of at least about 8.5 for at least about 17 hours; and then subjecting the alumina to a temperature of about 900° to about 1250° F. for a period sufficient to convert the same to the finished product.

12. A method for preparing alumina which comprises reacting a mixture including water, aluminum substantially free of oxide coating, hydrochloric acid and mercuric oxide at a temperature of about 175° to about 215° F. to form alumina; treating the alumina thus formed with ammonium hydroxide to adjust the pH to at least about 8.5; aging the treated alumina at said pH of at least about 8.5 for at least about 17 hours; drying the alumina at a temperature of about 150° to about 250° F. for at least about 10 hours; and then subjecting the dried alumina to a temperature of about 900° to about 1250° F. for a period sufficient to convert the same to the finished product.

References Cited in the file of this patent

UNITED STATES PATENTS

| | | |
|---|---|---|
| 2,258,099 | Patrick | Oct. 7, 1941 |
| 2,274,634 | Heard | Mar. 3, 1942 |
| 2,328,846 | Pitzer | Sept. 7, 1943 |
| 2,404,024 | Bailie et al. | July 16, 1946 |
| 2,449,847 | Heard | Sept. 21, 1948 |
| 2,492,167 | Marisic et al. | Dec. 27, 1949 |
| 2,595,415 | Schmerling | May 6, 1952 |
| 2,595,416 | Schmerling | May 6, 1952 |